(12) United States Patent
Bhide et al.

(10) Patent No.: US 12,130,721 B2
(45) Date of Patent: Oct. 29, 2024

(54) DATA GOVERNANCE POLICY RECOMMENDATIONS FOR APPLICATION PROGRAM INTERFACES

(71) Applicant: INTERNATIONAL BUSINESS MACHINES CORPORATION, Armonk, NY (US)

(72) Inventors: Manish Anand Bhide, Hyderabad (IN); Remus Lazar, Morgan Hill, CA (US); Ravi Chandra Chamarthy, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 32 days.

(21) Appl. No.: 17/347,651

(22) Filed: Jun. 15, 2021

(65) Prior Publication Data

US 2022/0398184 A1    Dec. 15, 2022

(51) Int. Cl.
*G06F 11/36* (2006.01)

(52) U.S. Cl.
CPC .............................. *G06F 11/3604* (2013.01)

(58) Field of Classification Search
None
See application file for complete search history.

(56) References Cited

U.S. PATENT DOCUMENTS

| | | | |
|---|---|---|---|
| 9,332,021 B2 | 5/2016 | Chahal | |
| 10,437,712 B1 * | 10/2019 | Tyler | G06F 11/3684 |
| 10,496,842 B1 * | 12/2019 | Ren | H04L 63/1433 |
| 10,757,139 B1 | 8/2020 | Cignetti et al. | |
| 2018/0300498 A1 | 10/2018 | Burton et al. | |
| 2018/0314622 A1 * | 11/2018 | Lowe | G06F 9/44526 |
| 2020/0137097 A1 | 4/2020 | Zimmermann et al. | |
| 2020/0233793 A1 * | 7/2020 | Ahamed | G06F 9/54 |
| 2020/0334134 A1 * | 10/2020 | Kalyanaraman | G06F 11/3692 |
| 2020/0401506 A1 * | 12/2020 | Sathianarayanan | G06F 9/54 |
| 2021/0240600 A1 * | 8/2021 | Larosa | G06F 11/3664 |
| 2021/0383007 A1 * | 12/2021 | Mardini | G06F 16/951 |

OTHER PUBLICATIONS

Mell et al., "The NIST Definition of Cloud Computing", NIST, Special Publication 800-145, Sep. 2011, 7 pages.
IBM Cloud Education, "API Management", Apr. 27, 2020, 8 pages.
IBM Cloud Education, "Data Catalog", Apr. 3, 2020, 8 pages.
Anonymous, "Packaging strategy and terminologyin API Connect", May 17, 2021, 9 pages.
Anonymous, "API", Wikipedia, May 17, 2021, 12 pages.

* cited by examiner

*Primary Examiner* — Lewis A Bullock, Jr.
*Assistant Examiner* — Mark A Gooray
(74) *Attorney, Agent, or Firm* — Rakesh Roy; Andrew D. Wright; Calderon Safran & Wright P.C.

(57) ABSTRACT

A computer-implemented method includes: receiving, by a computing device and from a user device, a request to validate an application program interface (API); validating, by the computing device, the API by performing a fetch analysis using different user profiles; returning, by the computing device and to the user device, a result of the fetch analysis; validating, by the computing device, the API by performing an insert/update analysis using the different user profiles; and returning, by the computing device and to the user device, a result of the insert/update analysis.

20 Claims, 5 Drawing Sheets

DATA GOVERNANCE POLICY RECOMMENDATIONS FOR APPLICATION PROGRAM INTERFACES

BACKGROUND

Aspects of the present invention relate generally to data governance and, more particularly, to data governance policy recommendations for application program interfaces.

In computing, an application programming interface (API) is an interface that defines interactions between multiple software applications or mixed hardware-software intermediaries. An API defines the kinds of calls or requests that can be made, how to make them, the data formats that should be used, the conventions to follow, etc. An API specifies how software components interact and provides quick access to common assets and processes. APIs can be public, can require client credentials, or can be kept private within an application.

Data governance is a defined process that an organization follows in order to ensure that high quality data exists throughout the complete lifecycle of the data. The key focus areas of data governance include availability, usability, integrity, and security. A part of data governance has to do with enforcing data governance policies. Data governance polices are defined using what is typically referred to as governance rules. An enterprise may have many different governance rules that apply to handling data within the enterprise.

SUMMARY

In a first aspect of the invention, there is a computer-implemented method including: receiving, by a computing device and from a user device, a request to validate an application program interface (API); validating, by the computing device, the API by performing a fetch analysis using different user profiles; returning, by the computing device and to the user device, a result of the fetch analysis; validating, by the computing device, the API by performing an insert/update analysis using the different user profiles; and returning, by the computing device and to the user device, a result of the insert/update analysis.

In another aspect of the invention, there is a computer program product including one or more computer readable storage media having program instructions collectively stored on the one or more computer readable storage media. The program instructions are executable to cause a development platform to: receive, from a user device, a request to validate an application program interface (API); validate the API by performing a fetch analysis using different user profiles; return, to the user device, a result of the fetch analysis; validate the API by performing an insert/update analysis using the different user profiles; and return, to the user device, a result of the insert/update analysis. In embodiments, the development platform interfaces with a data catalog and the API accesses one or more data assets in the data catalog.

In another aspect of the invention, there is system including a processor, a computer readable memory, one or more computer readable storage media, and program instructions collectively stored on the one or more computer readable storage media. The program instructions are executable to cause an application program interface (API) development platform to: receive, from a user device, a request to validate an API that was built in the API development platform; validate the API by performing a fetch analysis using different user profiles; return, to the user device, a result of the fetch analysis; validate the API by performing an insert/update analysis using the different user profiles; and return, to the user device, a result of the insert/update analysis. In embodiments, the development platform interfaces with a data catalog, the API accesses one or more data assets in the data catalog, and the request to validate the API includes input data for the fetch analysis and input data for the insert/update analysis.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
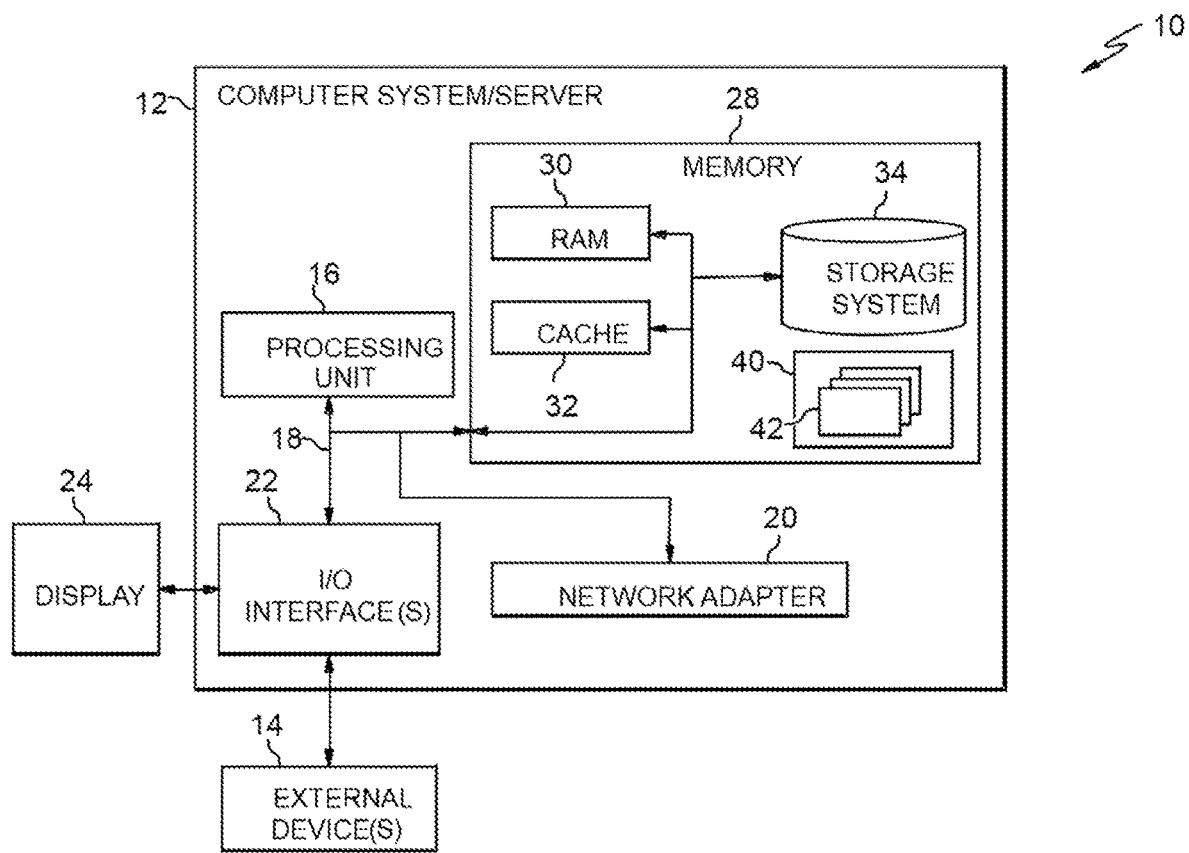
FIG. 1 depicts a cloud computing node according to an embodiment of the present invention.

Aspects of the present invention relate generally to data governance and, more particularly, to data governance policy recommendations for application program interfaces (APIs). When data is shared by an enterprise to its users outside the enterprise, it is typically done using APIs. These APIs are also used by users within the enterprise. Hence, when building these APIs, the API developer strives to ensure that the API does not inadvertently lead to a data security breach. An example of a data security breach could be that the API permits the users outside the enterprise to obtain access to personally identifiable information (e.g., credit card number, email address, etc.) of the enterprise's clients, when this information should instead only be available to users within the enterprise. It is the responsibility of the API developer to make sure that none of the data governance policies are violated. There can be a large number of data governance policies in the enterprise which makes it very difficult for the API developer to ensure that the APIs adhere to all the data governance policies. Hence there is a need for a recommendation system that recommends to the API developer the appropriate data governance policies that they can enforce thereby reducing the possibility that a data governance policy is breached.

An API developer creating a new API typically spends a significant amount of time identifying the correct data to associate with the API. Once the data is identified, the API developer may use an API development platform to build the API on top of the data. Identifying the correct data for an API can be challenging due in no small part to the task of the API developer communicating directly with databases to accomplish such identification.

Aspects of the invention address this challenge by providing an API development platform that permits a user to natively search for data assets from an enterprise data catalog and build APIs on top of data assets found in this manner. A benefit of such an API development platform is that it ensures API developers are using the best available data. Another benefit of an API development platform that interfaces with a data catalog is that this interface provides a way to propagate profile information from the data asset to the API. For example, an API that exposes a certain data asset (e.g., customer profile) can be instantly determined to access the data classes defined for this data asset (e.g., customer name, address, and zip code). This insight of what data class is exposed by the API is automated with an API development platform that interfaces with a data catalog, but would otherwise be difficult to determine by manually analyzing an API itself without benefit of the metadata included in the data catalog.

As used herein, a data asset represents data from a data source. Examples of data assets include a table in a relational database, a file in object storage, or a database which stores JavaScript Object Notation (JSON) data. A data source can be a relational database or object storage, which can contain multiple data assets.

A data catalog is a searchable metadata repository that stores information about all data assets in an enterprise (e.g., an organization). In this manner, the data catalog is a searchable inventory of all data assets in an enterprise, designed to help data professionals quickly find the most appropriate data for an analytical or business purpose.

In embodiments, a type of metadata stored by the data catalog is a profile of each data asset. The profile of a data asset includes generated metadata and statistics about its content. The profile of a data asset that contains relational or structured data shows information about each column in the data set. In one example, the profile includes data classes and statistics about the data for each column. Data classes describe the contents of the data in the column: for example, city, account number, or credit card number. Data classes are usable to mask data with policies. Data classes are also usable to restrict access to data assets with policies.

In embodiments, data governance policies are defined using rules that are based on data classes included in profiles of data assets. For example, a data governance rule may state: "If a data asset contains a column whose data class is a social security number, then all access to that column should be logged." In embodiments, data governance rules may also be based on user profiles defined for different types of users that interact with an enterprise. For example, a data governance rule may state: "An API should not expose, to a user external to the enterprise, data from a column whose data class is a social security number."

According to aspects of the invention, an API development platform is configured to interface with a data catalog and to validate APIs against data governance rules. In embodiments, the validation is based on profiles of data assets in the data catalog and also on user profiles. In embodiments, the API development platform includes a recommendation module that performs the validation and that returns validation results to a user (e.g., an API developer). In one example, the validation results may include an indication that the API under test complies with all data governance rules. In another example, the validation results may include an indication that the API under test fails to satisfy one or more of the data governance rules. In another example, the validation results may include a recommendation to the API developer.

It should be understood that, to the extent implementations of the invention collect, store, or employ personal information provided by, or obtained from, individuals (for example, personally identifiable information) such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
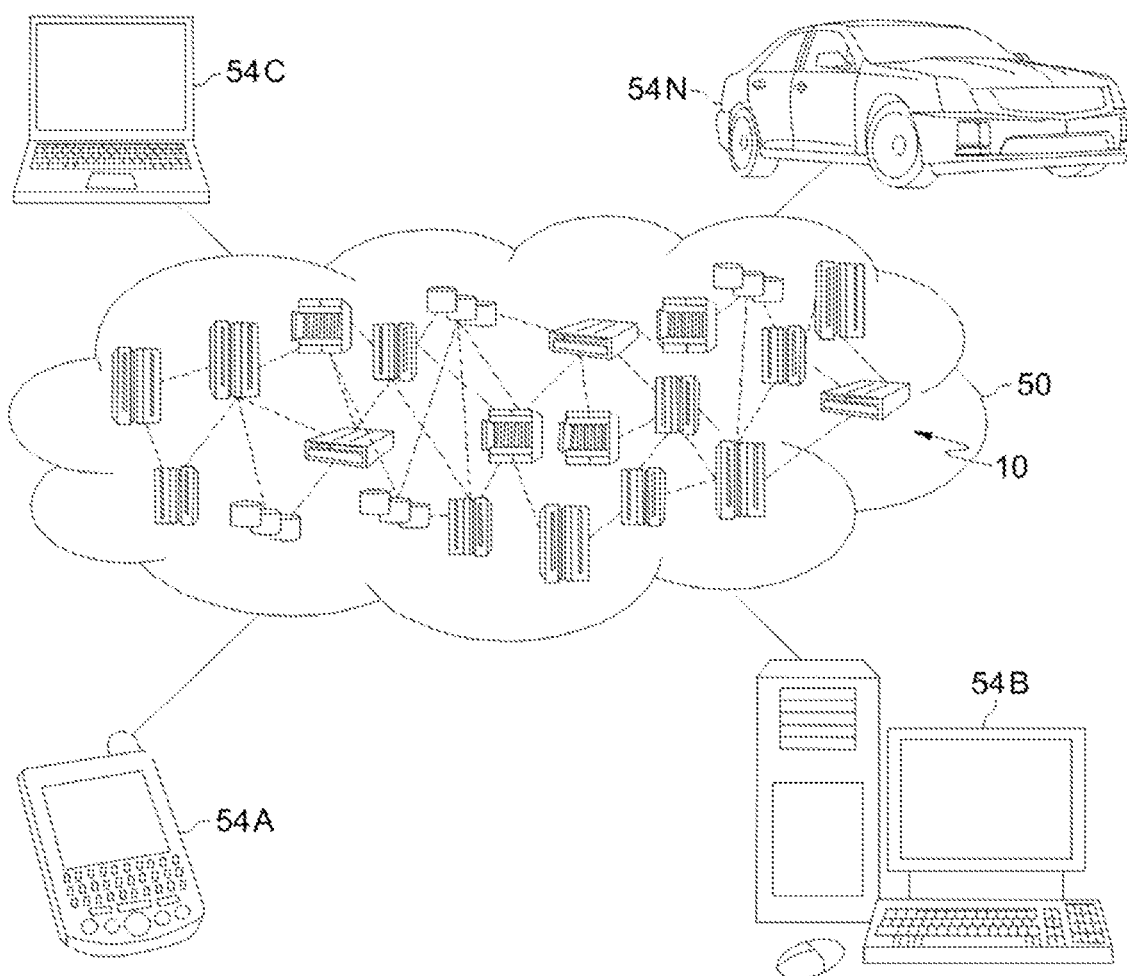
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
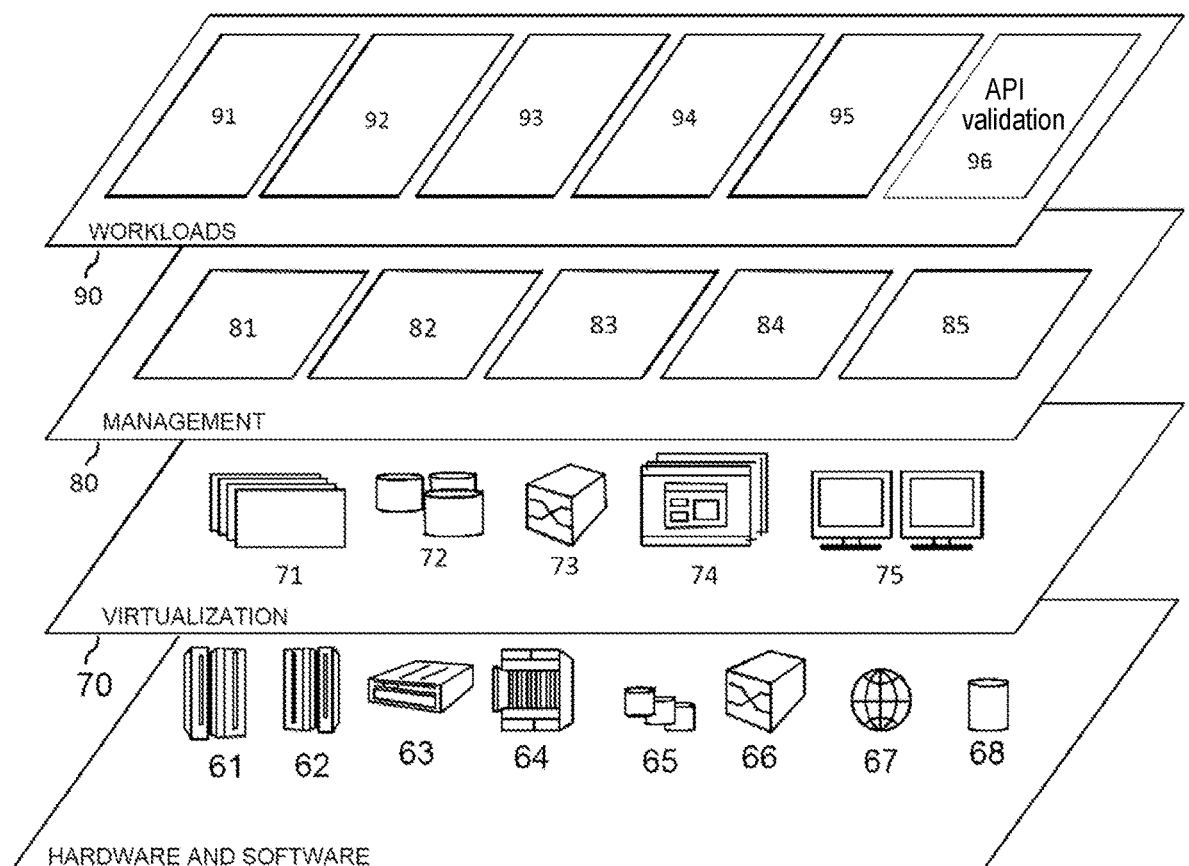
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and API validation 96.

Implementations of the invention may include a computer system/server 12 of FIG. 1 in which one or more of the program modules 42 are configured to perform (or cause the computer system/server 12 to perform) one of more functions of the API validation 96 of FIG. 3. For example, the one or more of the program modules 42 may be configured to cause an application program interface (API) development platform to: receive, from a user device, a request to validate an API that was built in the API development platform; validate the API by performing a fetch analysis using different user profiles; return, to the user device, a result of the fetch analysis; validate the API by performing an insert/update analysis using the different user profiles; and return, to the user device, a result of the insert/update analysis, wherein the development platform interfaces with a data catalog, the API accesses one or more data assets in the data catalog, and the request to validate the API includes input data for the fetch analysis and input data for the insert/update analysis.

Figure 4:
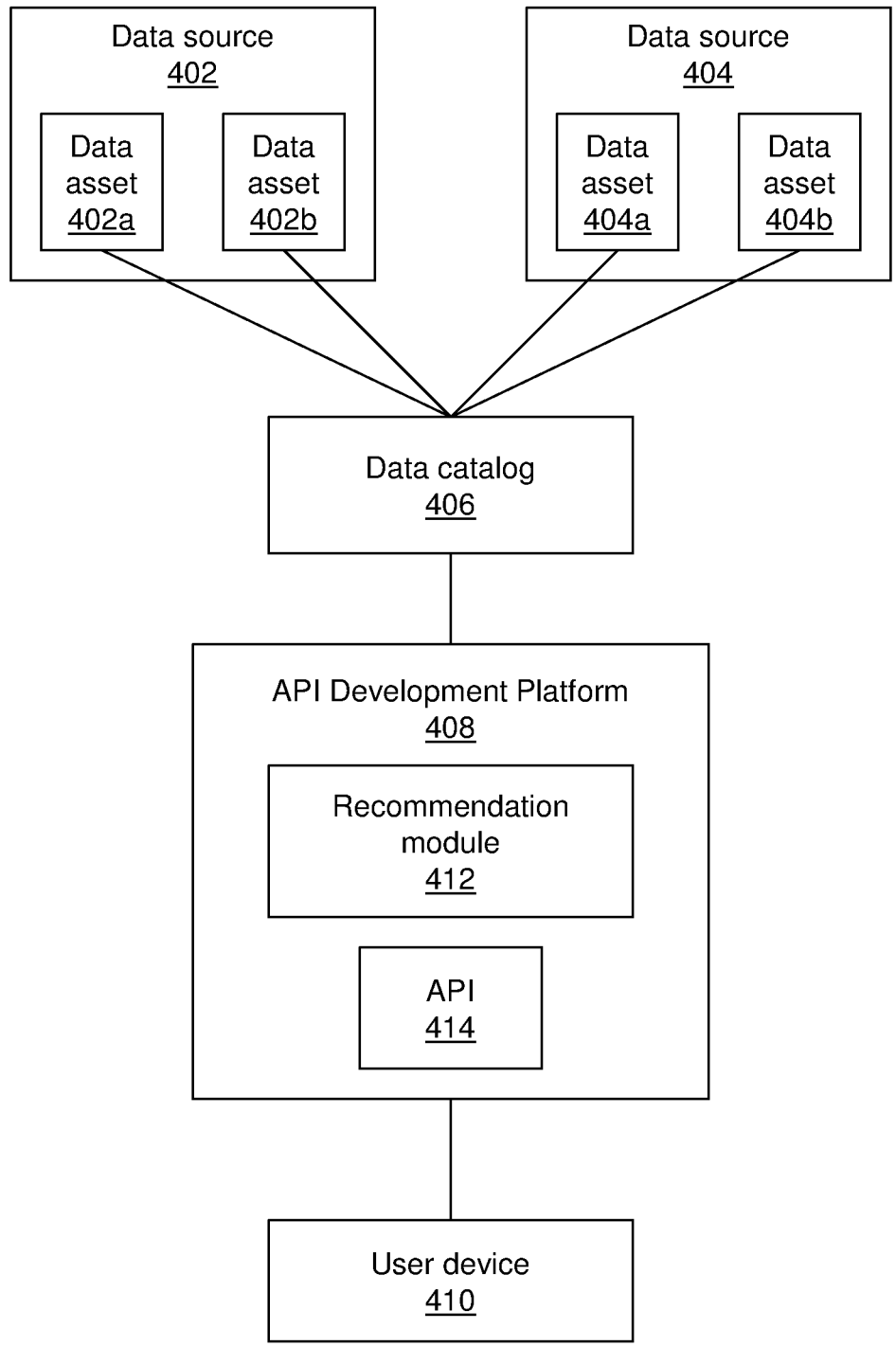
FIG. 4 shows a block diagram of an exemplary environment in accordance with aspects of the invention.

FIG. 4 shows a block diagram of an exemplary environment in accordance with aspects of the invention. In embodiments, the environment includes two data sources, 402 and 404, respectively. Each of the data sources 402, 404 may comprise a relational database controlled by an enterprise (e.g., an organization). The two data sources shown in FIG. 4 are only shown for purposes of illustration, and an enterprise may include one data source or more than two data sources.

In the environment shown in FIG. 4, each data source 402, 404 includes a number of data assets illustrated with reference numerals 402a, 402b, 404a and 404b, respectively. Also, here it should be understood that there are typically many more data assets in a data source and that the two data assets shown in FIG. 4 for each data source are only shown for purposes of illustration. In the following, for purposes of explanation, it is assumed that one of the data assets, for example, data asset 402a is a database table in a relational database.

In embodiments, the environment further includes a data catalog 406, which contains metadata about the data assets 402a, 402b, 404a and 404b, respectively. The metadata can include, for example, data about when the data asset was added to the data source, the profile of the data asset, etc. For example, if a data asset contains five columns, the metadata would include profile data that defines a respective data class for each of the five columns. Other types of metadata can also be includes in the data catalog 406. In embodiments, the data catalog 406 is a searchable inventory of all the data assets 402a, 402b, 404a and 404b in an enterprise.

With continued reference to FIG. 4, in accordance with aspects of the invention the environment includes an API development platform 408 that interfaces with the data catalog 406, and a user device 410 that interfaces with the API development platform 408. In embodiments, the API development platform 408 is a platform that lets users create, expose, and manage APIs in an enterprise. In embodiments, the API development platform 408 provides a user interface (UI) via the user device 410 by which a user may search for data assets using the data catalog 406, build an API on top of one or more data assets found via the data catalog 406, and validate the API against data governance rules of the enterprise.

The user device 410 comprises a computing device including one or more elements of computer system/server 12 of FIG. 1, and may include a desktop computer, laptop computer, tablet computer, or smartphone, for example. In embodiments, the API development platform 408 comprises one or more servers including one or more elements of computer system/server 12 of FIG. 1. The user device 410 communicates with the API development platform 408 via a network (not shown) that may include one or more communications networks such as one or more of a LAN, WAN, and the Internet. In a cloud implementation, the API development platform 408 comprises one or more cloud computing nodes 10 of FIG. 2, and the user device 410 comprises one of the local computing devices 54A-N of FIG. 2.

In embodiments, the API development platform 408 comprises a recommendation module 412, which may comprise one or more program modules such as program modules 42 described with respect to FIG. 1. The API development platform 408 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

In one example, a user (e.g., an API developer of an enterprise) utilizes the user device 410 to access an API development program that is provided by the API development platform 408. In embodiments, the API development program and a client application running on the user device 410 communicate with one another to display one or more working areas in a graphical user interface (UI) that is displayed on a display device of the user device 410. In one example, the client application comprises a browser application that receives data from the API development program and presents a visual display in the UI based on the data received from the API development program. In this example, the user utilizes the UI to search for one or more data assets 402*a*, 402*b*, 404*a*, 404*b* using the metadata of the data catalog 406, build an API 414 on top of one or more data assets found via the data catalog 406, and validate the API against data governance rules of the enterprise.

According to aspects of the invention, the user utilizes the recommendation module 412 to evaluate the API 414 in a development catalog after the user builds the API 414. In embodiments, the evaluation comprises providing different kinds of input data to the recommendation module 412, making calls to the API 414 using the input data, and determining if the API 414 violates any of one or more data governance rules by comparing the results of the calls to the data governance rules. Examples of input data that may be provided to the recommendation module 412 during the evaluation include: test data comprising a set of user/customer identifiers (IDs) that can make a GET call with the API 414 and a set of information/data that can be the subject of a PUT/POST call of the API 414; a set of users who can call this API, and their credentials; and optionally the profile of assets that this API access, which can be automatically inferred if the API has been built by connecting to one or more data assets. GET and POST are common operations of REST (Representational State Transfer) APIs, and should be understood by those of ordinary skill in the art.

In accordance with aspects of the invention, the recommendation module 412 is configured to perform two different types of analysis on the API 414: fetch analysis and insert/update analysis. In the fetch analysis, the recommendation module 412 determines whether the API 414 exposes any data to an unauthorized user profile in violation of a data governance rule of the enterprise. In the insert/update analysis, the recommendation module 412 determines whether the API 414 permits an unauthorized user profile to change data in violation of a data governance rule of the enterprise.

In embodiments, during the fetch analysis the recommendation module 412 calls the API 414 to fetch data using different user IDs having different user profiles. The recommendation module 412 may use a GET request on the API 414 in this analysis. In embodiments, the recommendation module 412 determines a data class of the data that is returned by API 414 in response to the GET request. In one example, the recommendation module 412 identifies the data class of the returned data based on the profile of the data asset that contains the returned data. As described herein, data classes may be defined in the profile of a data asset and may describe the contents of data in a column of the data asset. Non-limiting examples include email address, social security number, credit card number, customer full name, address, zip code, discount, etc. In embodiments, the recommendation module 412 receives the profile of the data asset of the returned data with the returned data as a result of the API call, and the recommendation module 412 determines the data class from this profile. Still referring to the fetch analysis, using the data class of the returned data and the user profile that was used to make the API call, the recommendation module 412 determines whether the API 414 is causing a data breach (e.g., exposing data to an unauthorized user profile in violation of a data governance rule of the enterprise).

For example, a data governance rule may state: "customer full name should not be returned to an external user." This data governance rule specifies a user profile (i.e., external user) and a data class (i.e., customer full name). In embodiments, during the fetch analysis the recommendation module 412 makes GET requests on the API 414 using different user IDs having different user profiles (including external user in this example). For a particular one of the calls made using a particular one of the user IDs having a particular one of the user profiles, the recommendation module 412 determines whether the pair of (i) data class of data returned by the API for this call, and (ii) user profile used to make the call violates a data governance rule. In this example, the recommendation module 412 determines for a GET request on the API 414 made using a user ID that has an "external user" user profile, whether the API 414 returns data having data class "customer full name." In this example, if the API 414 returns data having data class "customer full name" for a call from a user ID having the "external user" user profile, then the recommendation module 412 provides an alert to the user at the user device 410 indicating a data breach. In embodiments, the recommendation module 412 makes plural such calls using different user IDs having different user profiles, and for each call determines whether there is a data breach by comparing the pair of (i) data class of data returned by the API for this call, and (ii) user profile used to make the call to all the data governance rules in the enterprise.

Still referring to the fetch analysis, in the event the recommendation module 412 determines the API 414 permits a data breach, then the recommendation module 412 may make a recommendation to the user at the user device 410. In one example, the recommendation module 412 recommends that the user fix the data breach by adding obfuscation of deletion logic to the API 414 for the data included in the data class associated with the data breach. In the example described above, the recommendation module 412 would recommend that the user modify the API 414 to obfuscate or delete data having the data class "customer full name" when returning data to a user ID having the "external user" user profile. In some embodiments, the recommendation module 412 may prompt the user to add such obfuscation of deletion logic to the API 414 in the UI of the API development platform 408. In other embodiments, the API development platform 408 may be configured to automatically modify the API 414 by automatically adding the obfuscation of deletion logic to the API 414 in response to the recommendation module 412 identifying a data breach in this manner.

In embodiments, during the insert/update analysis the recommendation module 412 calls the API 414, using different user IDs having different user profiles, to insert/update data in a data asset. The recommendation module 412 may use PUT or POST requests on the API 414 in this analysis. The test data in this example may include a data payload that is to be inserted or updated into a data asset. In embodiments, the recommendation module 412 determines whether the API 414 changes data having a particular data class (defined in a data governance rule) as a result of a request from a user ID having a particular user profile (defined in the same data governance rule). For example, an enterprise may have a data governance rule stating that data having a particular data class cannot be changed by a user having a particular user profile. For example, a data governance rule may state: "only a gold user can update the discount offered to a client." This data governance rule contains a data class (i.e., "discount") and a user profile (i.e., "gold user"). In embodiments, the recommendation module 412 runs the API 414 using different user IDs having different user profiles (e.g., enterprise user, external user, silver user, gold user), and determines whether the API 414 permits any of the user profiles to change data in the discount column of the data asset.

In the event the recommendation module 412 determines the API 414 permits a data breach based on the insert/update analysis, then the recommendation module 412 provides an alert to the user at the user device 410 indicating a data breach. In embodiments, in the event the recommendation module 412 determines the API 414 permits a data breach based on the insert/update analysis, then the recommendation module 412 may make a recommendation to the user at the user device 410.

Data defining the data governance rules used in the fetch analysis and the insert/update analysis may be stored in the API development platform 408 or in a data storage that is accessed by the API development platform 408. Data defining the user IDs and user profiles may be stored in the API development platform 408 or in a data storage that is accessed by the API development platform 408. For purposes of illustration, this description uses example user profiles of enterprise user, external user, silver user, gold user; however, in implementations an enterprise may define other user profiles, and may define any number of data governance rules that are based on data classes and one or more of the user profiles.

Figure 5:
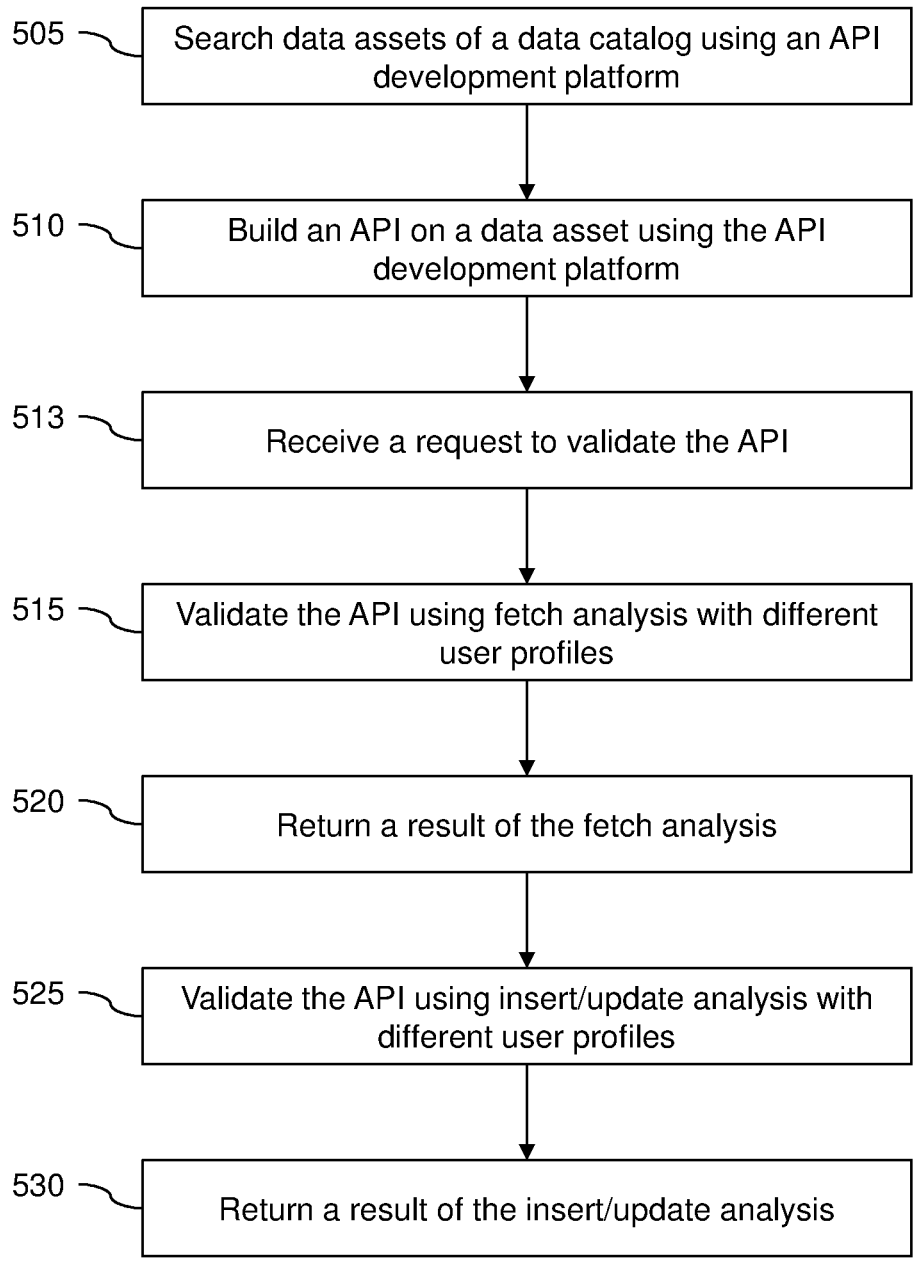
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 505, the system searches data assets of a data catalog using an API development platform. In embodiments, and as described with respect to FIG. 4, the API development platform 408 provides a user interface (UI) at a user device 410 that permits a user to search for data assets of a data catalog 406. The search may include a keyword search that compares search terms received at the UI to metadata stored in the data catalog 406, and that returns a list of data assets that have metadata that matches the search terms.

At step 510, the system builds an API on a data asset using the API development platform. In embodiments, and as described with respect to FIG. 4, the API development platform 408 provides a user interface (UI) at a user device 410 that permits a user to create an API 414 that accesses data in a data asset that was found at step 505. The API development platform 408 may include low-code or no-code techniques (e.g., predefined objects and templates that a user may manipulate in the UI) that permit a user to create the API using in the UI.

At step 513, the system receives a request to validate the API that was built at step 510. In embodiments, the API development platform 408 receives a request from the user device 410 to validate the API 414. The request may be made in the user interface (UI) of the user device 410 and may include an indication of the API 414 to be validated. Step 513 may also include the API development platform 408 receiving input data for the fetch analysis and input data for the insert/update analysis, also from the user device 410. The input data for the fetch analysis may include a set (e.g., a list) of different user IDs having different user profiles with which to make calls to the API 414 during the fetch analysis. The input data for the fetch analysis may also include data identifiers and data profiles. The input data for the insert/update analysis may include a set (e.g., a list) of different user IDs having different user profiles with which to make calls to the API 414 during the insert/update analysis. The input data for the insert/update analysis may also include a data payload to add using the API and data profiles. Upon receiving the request to validate and the input data, the recommendation module 412 may be configured to automatically perform the fetch analysis and the insert/update analysis, and to return results of the analyses to the user device 410 as described herein.

At step 515, the system validates the API (built at step 510) using a fetch analysis with different user profiles. In embodiments, and as described with respect to FIG. 4, the recommendation module 412 uses plural different user IDs to make calls to the API 414 to retrieve data from the data asset. As described herein, the different user IDs may have different user profiles (e.g., enterprise user, external user, silver user, gold user). As described herein, data governance rules may include an indication of a user profile and an indication of a data class of data in the data asset. In embodiments, for each call using the API 414 during the fetch analysis, the recommendation module 412 receives the data that is returned for the call and also the data class of the data that is returned for the call. In embodiments, for each call using the API 414 during the fetch analysis, the recommendation module 412 compares the user profile (with which the call was made) and the data class (of the returned data) to all the data governance rules. Based on this comparing, the recommendation module 412 determines whether there is a data breach, e.g., whether the API 414 exposes a data class to a user profile in a manner that violates one or more of the data governance rules.

At step 520, the system returns a result of the fetch analysis that was performed at step 515. In embodiments, the result is returned to the user via the user device 410. The result may include an indication that the fetch analysis did not find a data breach. Alternatively, the result may include an indication that the fetch analysis did find a data breach. In embodiments, and as described with respect to FIG. 4, when the fetch analysis finds a data breach, the recommendation module 412 causes the user device 410 to output an alert based on the data breach. The alert may include information that defines the data breach, such as information identifying the data class, the user profile, and the data governance rule that are the subject of the data breach. A recommendation at step 520 may include a recommendation to add obfuscation or deletion logic to the API 414 to eliminate the data breach.

At step 525, the system validates the API (built at step 510) using an insert/update analysis with different user profiles. In embodiments, and as described with respect to FIG. 4, the recommendation module 412 uses plural different user IDs to make calls to the API 414 to insert/update data in the data asset. As described herein, the different user IDs may have different user profiles (e.g., enterprise user, external user, silver user, gold user). As described herein, data governance rules may include an indication of a user profile and an indication of a data class of data in a data asset. In embodiments, for each call using the API 414 during the insert/update analysis, the recommendation module 412 determines whether the API 414 changes the data of a particular data class in the data asset. When the API 414 does change the data, the recommendation module 412 then compares the user profile (with which the call was made) and the data class (of the changed data) to all the data governance rules. Based on this comparing, the recommendation module 412 determines whether there is a data breach, e.g., whether the API 414 permits a user profile to change data having a data class in a manner that violates one or more of the data governance rules.

At step 530, the system returns a result of the insert/update analysis that was performed at step 525. In embodiments, the result is returned to the user via the user device 410. The result may include an indication that the insert/update analysis did not find a data breach. Alternatively, the result may include an indication that the insert/update analysis did find a data breach. In embodiments, and as described with respect to FIG. 4, the recommendation module 412 causes the user device 410 to output an alert based on the recommendation module 412 finding a data breach in the insert/update analysis. The alert may include information that defines the data breach, such as information identifying the data class, the user profile, and the data governance rule that are the subject of the data breach. A recommendation at step 530 may include a recommendation to the user to take action to prevent the user profile from changing the data having the data class.

As described herein, implementations of the invention provide a system and method that allow API developers to build APIs by directly accessing a data asset in a data catalog, as opposed to directly accessing the data itself. In embodiments, the system permeates the governance information from the data asset to the API.

As described herein, implementations of the invention provide a system and method for an API recommendation module that analyzes the data returned by an API to determine if the API is returning data belonging to a specific data class when called by a user having a specific user profile, and whether this pair of data class and user profile violates a data governance rule. In embodiments, upon determining a violation of a data governance rule in this manner, the system makes a recommendation to the user to fix the violation.

As described herein, implementations of the invention provide a system and method for an API recommendation module that determines when the API permits a user having a specific user profile to update data belonging to a specific data class, and whether this pair of data class and user profile violates a data governance rule. In embodiments, upon determining a violation of a data governance rule in this manner, the system makes a recommendation to the user to fix the violation.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computing device and from a user device, a request to validate that an application program interface (API) complies with data governance rules of an enterprise indicating how different categories of sensitive data may be accessed by different users;
performing, by the computing device, a fetch analysis comprising:
performing a set of calls for accessing data in the different categories of sensitive data to the API, by the computing device, wherein each call of the set of calls is made using a different user identification (ID) associated with different respective user profiles;
obtaining, by the computing device, a set of returned data from the API in response to the set of calls;

determining, by the computing device, categories of sensitive data in the set of returned data; and validating, by the computing device, that the API complies with the data governance rules using the set of returned data by, for each call of the set of calls:

comparing a respective one of the different user profiles, with which the call was made, and the determined category of sensitive data of the returned data to the governance rules of the enterprise; and determining, based on the comparing, whether the API violated one or more of the data governance rules of the enterprise by giving the respective user unauthorized access to the determined category of sensitive data;

returning, by the computing device and to the user device, a result of the fetch analysis;

further validating, by the computing device, whether the API violates the data governance rules by performing an insert/update analysis using the different respective user profiles by determining if at least one of a plurality of data assets accessed by the API includes unauthorized data changes for one or more predetermined categories of data;

returning, by the computing device and to the user device, a result of the insert/update analysis; and in response to each respective violated data governance rule, automatically modifying the API by adding obfuscating or deleting logic to fix each respective violated data governance rule.

2. The method of claim 1, wherein each of the different calls of the set of calls to the API are configured to retrieve data from at least one of the plurality of data assets in a data catalog.

3. The method of claim 2, wherein the returning the result of the fetch analysis comprises generating an alert that indicates the API violates the one or more of the data governance rules of the enterprise.

4. The method of claim 1, wherein the returning the result of the fetch analysis comprises making a recommendation for fixing the API.

5. The method of claim 1, wherein the insert/update analysis includes making different calls to the API using the different user profiles, each of the different calls being configured to change data in at least one of a plurality of data assets in a data catalog.

6. The method of claim 5, further comprising, for each of the different calls in the insert/update analysis:

determining the predetermined category of data changed by the call;

comparing a respective one of the different user profiles, with which the call was made, and the predetermined category of the changed data to the data governance rules of the enterprise; and determining, based on the comparing, whether the API violates one or more of the data governance rules of the enterprise.

7. The method of claim 6, wherein the returning the result of the insert/update analysis comprises generating an alert that indicates the API violates the one or more of the data governance rules of the enterprise.

8. The method of claim 1, wherein:

the API is built using an API development platform that interfaces with a data catalog; and the fetch analysis and the insert/update analysis are performed by a recommendation module included in the API development platform.

9. A computer program product comprising one or more computer readable storage media having program instructions collectively stored on the one or more computer readable storage media, the program instructions executable to cause a development platform to:

receive, from a user device, a request to validate that an application program interface (API) complies with data governance rules of an enterprise indicating how different categories of sensitive data may be accessed by different users;

perform a fetch analysis comprising:

perform a set of calls for accessing data in the different categories of sensitive data to the API, wherein each call of the set of calls is made using a different user identification (ID) associated with different respective user profiles;

obtain a set of returned data from the API in response to the set of calls;

determine categories of sensitive data in the set of returned data; and validate that the API complies with the data governance rules using the set of returned data by, for each call of the set of calls:

compare a respective one of the different user profiles, with which the call was made, and the determined category of sensitive data of the returned data to the governance rules of the enterprise; and determine, based on the comparing, whether the API violated one or more of the data governance rules of the enterprise by giving the respective user unauthorized access to the determined category of sensitive data;

return, to the user device, a result of the fetch analysis;

further validate that the API complies with the data governance rules by performing an insert/update analysis using the different respective user profiles by determining if one or more data assets accessed by the API include unauthorized data changes by the API for one or more predetermined categories of data;

return, to the user device, a result of the insert/update analysis; and in response to each respective violated data governance rule, automatically modify the API by adding obfuscate or delete logic to fix each respective violated data governance rule, wherein the development platform interfaces with a data catalog; and the API accesses the one or more data assets in the data catalog.

10. The computer program product of claim 9, wherein each call of the set of calls to the API is configured to retrieve data from one of the one or more data assets in the data catalog.

11. The computer program product of claim 9, wherein the returning the result of the fetch analysis comprises generating an alert that indicates the API violates the one or more of the data governance rules of the enterprise.

12. The computer program product of claim 9, wherein the insert/update analysis includes making other set of calls to the API using the different user profiles, each of the different calls being configured to change data in one of the one or more data assets in the data catalog.

13. The computer program product of claim 12, wherein the program instructions cause a development platform to, for each of the different calls in the insert/update analysis:

determine a predetermined category of data changed by the call;

compare a respective one of the different user profiles, with which the call was made, and the predetermined category of data of the changed data to data governance rules of the enterprise; and determine, based on the comparing, whether the API violates one or more of the data governance rules of the enterprise.

14. The computer program product of claim 13, wherein the returning the result of the insert/update analysis comprises generating an alert that indicates the API violates the one or more of the data governance rules of the enterprise.

15. A system comprising:

a processor, a computer readable memory, one or more computer readable storage media, and program instructions collectively stored on the one or more computer readable storage media, the program instructions executable to cause an application program interface (API) development platform to:

receive, from a user device, a request to validate that an API that was built in the API development platform complies with data governance rules indicating how different categories of sensitive data may be accessed by different users;

perform a fetch analysis comprising:

perform a set of calls for accessing data in the different categories of sensitive data to the API, wherein each call of the set of calls is made using a different user identification (ID) associated with different respective user profiles;

obtain a set of returned data from the API in response to the set of calls; and validate that the API complies with the data governance rules using the set of returned data by, for each call of the set of calls, comparing a respective one of the different user profiles, with which the call was made, and determined categories of sensitive data to data governance rules of an enterprise;

determine, based on the comparing, whether the API violated one or more of the data governance rules of the enterprise by giving the respective user unauthorized access to the determined category of sensitive data;

further validate whether the API violates the data governance rules by performing an insert/update analysis using the different respective user profiles by determining if one or more data assets accessed by the API include unauthorized data changes for one or more predetermined categories of data; and automatically modify the API by automatically adding obfuscation or deletion logic for each respective violated data governance rule in order to fix the unauthorized access or changes to the determined categories of sensitive data causing the violation, wherein the API development platform interfaces with a data catalog;

the API accesses the one or more data assets in the data catalog; and the request to validate the API includes input data for the fetch analysis and input data for the insert/update analysis.

16. The system of claim 15, wherein each of the different calls of the set of calls to the API is configured to retrieve data from the one of the one or more data assets in the data catalog.

17. The system of claim 15, wherein the insert/update analysis includes making other set of calls to the API using the different user profiles, each of the different calls being configured to change data in the one of the one or more data assets in the data catalog.

18. The system of claim 17, wherein the program instructions cause the API development platform to, for each of the different calls in the insert/update analysis:

determine a predetermined category of data changed by the call;

compare a respective one of the different user profiles, with which the call was made, and the predetermined category of data of the changed data to data governance rules of the enterprise; and determine, based on the comparing, whether the API violates one or more of the data governance rules of the enterprise.

19. The system of claim 18, wherein the program instructions cause the API development platform to generate an alert that indicates the API violates the one or more of the data governance rules of the enterprise.

20. The system of claim 15, wherein:

the API is built using an API development platform that interfaces with a data catalog; and the fetch analysis and the insert/update analysis are performed by a recommendation module included in the API development platform.

\* \* \* \* \*